United States Patent [19]

Angevine et al.

[11] Patent Number: 4,521,297

[45] Date of Patent: Jun. 4, 1985

[54] CATALYTIC CONVERSION OF SHALE OIL

[75] Inventors: Philip J. Angevine, West Deptford; Günter H. Küehl; Sadi Mizrahi, both of Cherry Hill, all of N.J.

[73] Assignee: Mobil Oil Corporation, New York, N.Y.

[21] Appl. No.: 350,943

[22] Filed: Feb. 22, 1982

[51] Int. Cl.$^3$ .................... C10G 11/05; C10G 47/16; C10G 69/06

[52] U.S. Cl. ..................................... 208/89; 208/111; 208/120; 423/328

[58] Field of Search ................. 208/120, 111, DIG. 2, 208/89

[56] References Cited

U.S. PATENT DOCUMENTS

| | | | |
|---|---|---|---|
| 3,832,449 | 8/1974 | Rosinski et al. | 208/111 |
| 3,970,544 | 7/1976 | Rosinski et al. | 208/111 |
| 4,088,605 | 5/1978 | Rollman | 423/328 X |
| 4,199,556 | 4/1980 | Plank et al. | 423/329 |
| 4,210,521 | 7/1980 | Gorring et al. | 208/89 |
| 4,269,813 | 5/1981 | Klotz | 423/277 |
| 4,394,251 | 7/1983 | Miller | 208/111 |
| 4,394,362 | 7/1983 | Miller | 423/328 |
| 4,482,774 | 11/1984 | Koetsier | 208/111 |

OTHER PUBLICATIONS

Ballmoos & Meier "Zoned Al Distribution in Synthetic Zeolite", Nature, 289, pp. 782–783 (Feb. 1981).

*Primary Examiner*—Delbert E. Gantz
*Assistant Examiner*—O. Chaudhuri
*Attorney, Agent, or Firm*—A. J. McKillop; M. G. Gilman; M. V. Schneller

[57] ABSTRACT

The invention provides a process of converting shale oil fractions with the catalyst made by beginning the synthesis in the usual way and adding additional trivalent metal ion after crystallization is 20 to 90 percent complete and continuing the crystallization, whereby a zeolite having the same crystal structure throughout, but having different silica-to-alumina molar ratios in the inner core and outer shell is obtained.

14 Claims, No Drawings

CATALYTIC CONVERSION OF SHALE OIL

CROSS REFERENCE TO RELATED INVENTIONS

The method of preparing the zeolites used in this invention is disclosed and claimed in U.S. application Ser. No. 557,735 filed Feb. 9, 1984, which is a continuation of Ser. No. 291,006, filed Aug. 7, 1981, now abandoned. The application is incorporated herein by reference in order, inter alia, to provide a complete description of the method of preparing the zeolites.

This application is related to U.S. application Ser. No. 281,450, filed July 8, 1981 and now U.S. Pat. No. 4,419,218. This reference claims catalytic hydroconversion of shale oil using a catalyst comprising ZSM-12.

BACKGROUND OF THE INVENTION

1. Field of the Invention

This invention relates to the catalytic conversion of shale oil. More particularly, it relates to such conversion using a zeolite catalyst having a low constraint index and an outer shell having a lower $SiO_2/Al_2O_3$ molar ratio than the inner shell.

2. Discussion of the State of the Art

Catalytic reactions involving petroleum feed stocks have been known in the petroleum industry for a long time, e.g., the catalytic conversion of naphtha stocks. U.S. Pat. No. 4,191,638, for example, teaches most naphthas contain large amounts of naphthenes and aromatics and that, while the octane numbers are low, these stocks lend themselves well to catalytic conversion to gasoline stocks. On the other hand, shale oils, which have relatively high concentrations of paraffins and naphthenes, are not desirable as a feed to produce gasoline.

In U.S. Pat. No. 3,322,194, it is disclosed that vast quantities of hydrocarbons are contained in oil shale formations which are found in several parts of the world and particularly in the Piceance Creek Basin of the Green River Formation of Colorado. In these formations, the oil shale is not a true shale nor does it contain oil in the common usage of that term. The oil shale is a fine-grained, compact sedimentary rock which is generally highly laminated in the horizontal by bedding planes. It is more in the nature of marlstone. It contains an organic matter, kerogen, which is an amorphous organic solid. Kerogen, particularly, is defined as an organic, high molecular weight mineraloid of indefinite composition. The kerogen is not soluble in conventional solvents but will decompose by pyrolysis upon being heated to temperatures above 500° F. to provide fluid hydrocarbons commonly termed "shale oil". Generally, the decomposition is undertaken at temperatures about 900° F. However, excessive temperatures are usually avoided in the pyrolysis of kerogen to avoid heat consumption by the decomposition of the mineral carbonate constituents in the oil shale. Thus, oil shale must be heated in a process of pyrolysis, which process is usually termed "retorting", in order to obtain the desired recovery of hydrocarbons. For this purpose, it is necessary to either mine the oil shale and then retort it at the earth's surface, or to retort it in-place.

U.S. Pat. No. 4,112,056 discloses an improved process for making a zeolite having a high-silica-alumina mole ratio comprising adding a source of aluminum ions to a silica-rich amorphous reaction medium at a rate whereby the concentration of aluminum ions in the amorphous phase is maintained at a steady state.

U.S. Pat. No. 4,148,713 and U.S. Pat. No. 4,203,869 teach a crystalline aluminosilicate zeolite having an outer shell of silicate of the same crystal structure as the aluminosilicate.

Other patents applicants are aware of are U.S. Pat. Nos. 3,554,900; 3,615,188; 3,624,003; 3,625,866; 3,629,152; 4,050,539; 4,060,480; 4,088,605; 4,090,981; 4,241,036; and 4,246,138. It should be noted that they are of interest only in that although they all deal with catalysts and some deal with catalyst surface treatment, none teach or suggest the zeolites of this invention or their use or preparation in the manner claimed.

SUMMARY OF THE INVENTION

In accordance with the invention, there is provided a process for selectively converting a feed comprising shale oil or heavy shale oil fraction, especially the 850° F.+ fraction, to a fraction containing from about 50 percent to about 95 percent by weight of oil boiling in the 400°–650° F. boiling range, comprising contacting said feed with a crystalline metallo-silicate zeolite made by steps comprising forming a reaction mixture containing sources of an alkali metal, e.g. an alkali metal oxide, or an alkaline earth metal, e.g. an alkaline earth metal oxide, optionally an organic nitrogen, e.g. organic nitrogen-containing oxide, trivalent metal from Groups III through VIII of the Periodic Table, e.g., aluminum, gallium, boron, chromium or iron), silicon and water, said mixture having the appropriate composition in terms of mole ratios of oxides to form said zeolite, reacting until crystallization is from about 20 percent to about 90 percent complete and adding a source of trivalent metal to the partially crystallized reaction mixture, thereby decreasing the silica-to-trivalent metal oxide ratio in the uncrystallized portion of said reaction mixture and forming an outer shell having the same trivalent metal and a lower silica-to-trivalent metal oxide ratio than the inner core, but having the same crystal structure.

DISCUSSION OF SPECIFIC EMBODIMENTS

Concerning the zeolites that may be made by the method disclosed herein, the inner cores thereof may be identified in terms of mole ratios of oxides substantially as follows:

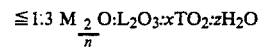

wherein M is a cation, n is the valence of said cation, L is a trivalent metal atom, or mixtures thereof, from Groups III through VIII of the Periodic Table, including, for example, Groups IIIB (e.g., aluminum, gallium, and boron), Group VIA (e.g., chromium) and Group VIII (e.g., iron), T is silicon or germanium, x is greater than 12 and z is 0 to 2000.

One can use the disclosed method to prepare materials in which the trivalent metal in the outer shell and the inner core may be the same or different. For example, the inner core may contain aluminum and the outer shell boron, or vice versa, the outer shell and inner core can contain only aluminum or only boron as the trivalent material.

The silica-to-alumina ratio in the inner core and in the outer shell is at least 12, with the ratio in the outer shell being lower than in the inner core. It will be understood from this description that when the trivalent metal oxide is not alumina, the $SiO_2/L_2O_3$ ratio can be higher or lower than the $SiO_2/L_2O_3$ ratio of the inner core. Alternatively, the zeolite can be prepared by suspending zeolite crystals that are to be the inner core, in a reaction mixture containing sources of silicon, trivalent metal, alkali metal and optionally organic nitrogen. The invention also provides a new zeolite.

In a preferred synthesized form, the inner core of the zeolite has a formula, in terms of mole ratios of oxides, as follows:

$$\leq 1.3 \frac{M_2}{n} O : Al_2O_3 : xSiO_2 : zH_2O$$

where M is a mixture of alkali metal cations, especially sodium, and, optionally, alkylammonium cations, the alkyl groups of which preferably contain from 1 to 5 carbon atoms, x is greater than 12 and z is 0 to 2000.

One preferred zeolite prepared in accordance with the method disclosed has the crystal structure of ZSM-12, in which the silica/trivalent metal oxide ratio in the inner core is at least 12 and can range up to 4000 or more. In the outer shell, the ratio is lower than in the core and can go as low as 12. Preferably the silica/trivalent metal oxide ratio will range from about 40 to 4000 or more, more preferably from about 40 to about 250. Other zeolites useful herein and which fit this description are ZSM-35, ZSM-38 and zeolite Beta. Conventional methods of preparing these four zeolites are found respectively in U.S. Pat. Nos. 3,832,449, 4,046,859, 4,076,842 and 3,308,069, the entire contents of which are incorporated herein by reference. Other useful zeolites may include zeolite Omega, (TMA) offretite and mordenite.

The crystalline zeolites made by the herein disclosed method have the crystal structures of particular members of a class of zeolitic materials which exhibit unusual properties. Although the preferred zeolites normally have unusually low alumina contents, i.e. high silica to alumina mole ratios, they are very active even when the silica to alumina mole ratio exceeds 30. The activity thereof is surprising since catalytic activity is generally attributed to framework aluminum atoms and/or cations associated with these aluminum atoms. They retain their crystallinity for long periods despite the presence of steam at high temperature which induces irreversible collapse of the framework of other zeolites, e.g. of the X and A type. Furthermore, carbonaceous deposits, when formed, may be removed by burning at higher than usual temperatures to restore activity. These zeolites, used as catalysts, generally have low coke-forming activity and therefore are conducive to long times on stream between regenerations by burning carbonaceous deposits with oxygen-containing gas such as air.

In general, the silica-to-trivalent metal oxide mole ratio referred to may be determined by conventional analysis. This ratio is meant to represent, as closely as possible, the ratio in the rigid anionic framework of the zeolite crystal and to exclude trivalent metal oxide in the binder or in cationic or other form within the channels. Although zeolites with, for example, a silica-to-alumina mole ratio of at least 12 are often prepared, it is preferred in some instances to prepare zeolites having in their inner core a substantially higher silica/alumina ratio, e.g. 1600 and above. In addition, the conventional zeolites as otherwise characterized herein but which are substantially free of aluminum or other trivalent element in the inner core, that is zeolites having in their inner core extremely high silica-to-alumina mole ratios, are contemplated for use in preparing the novel zeolites of this invention and even preferable in some instances.

The zeolites, after activation, acquire an intracrystalline sorption capacity for normal hexane which is greater than that for water, i.e. they exhibit "hydrophobic" properties. This hydrophobic character can be used to advantage in some applications.

The zeolites useful herein have an effective pore size such as to freely sorb normal hexane. In addition, the structure may provide constrained access to larger molecules.

Rather than attempt to judge from crystal structure whether or not a zeolite possesses constrained access to molecules of larger cross-section than normal paraffins, a simple determination of the "constraint index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. for at least 15 minutes. The zeolite is then flushed with helium and the temperature is adjusted between 290° C. and 510° C. to give an overall conversion of between 10 percent and 60 percent. The mixture of hydrocarbons is passed at 1 liquid hourly space velocity (i.e., 1 volume of liquid hydrocarbon per volume of zeolite per hour) over the zeolite with a helium dilution to give a helium to (total) hydrocarbon mole ratio of 4:1. After 20 minutes on stream, a sample of the effluent is taken and analyzed, most conveniently by gas chromatography, to determine the fraction remaining unchanged for each of the two hydrocarbons.

While the above experimental procedure will enable one to achieve the desired overall conversion of 10 to 60 percent for most zeolite samples and represents preferred conditions, it may occasionally be necessary to use somewhat more severe conditions for samples of very low activity, such as those having an exceptionally high silica to alumina mole ratio. In those instances, a temperature of up to about 540° C. and a liquid hourly space velocity of less than one, such as 0.1 or less, can be employed in order to achieve a minimum total conversion of about 10 percent.

The "Constraint Index", as mentioned hereinabove, is calculated as follows:

$$\text{Constraint Index} = \frac{\log_{10} (\text{fraction of hexane remaining})}{\log_{10} (\text{fraction of 3-methylpentane remaining})}$$

The constraint index approximates the ratio of the cracking rate constants for the two hydrocarbons. Zeolites broadly contemplated in the present invention are those having a constraint index of about 0.4 to about 5, with a silica-to-trivalent metal oxide ratio in the inner core of at least 12 and in the outer shell of at least 12, but lower than in the core, in the case of Al-rich shell. The zeolites made by the process of this invention have the same uses as described in the incorporated references. One important use, as already stated, is in the shale oil conversion process.

The above-described constraint index is an important and even critical definition of those zeolites which are useful in shale oil conversion. The very nature of this parameter and the recited technique by which it is determined, however, admit of the possibility that a given zeolite can be tested under somewhat different conditions and thereby exhibit different constraint indices. Constraint index seems to vary somewhat with severity of operation (conversion) and the presence or absence of binders.

The original cations of the zeolites made by the present method can be subsequently replaced, at least in part, by calcination and/or ion exchange with another cation. Thus, the original cations are exchanged into a hydrogen or hydrogen ion precursor form or into a form in which the original cation has been replaced by a metal ion of Groups II through VIII of the Periodic Table. Thus, for example, it is contemplated to exchange the original cations with ammonium ions or with hydronium ions. Catalytically active forms of these would include, in particular hydrogen, rare earth metals, aluminum, manganese and other metals of Groups II and VIII of the Periodic Table.

It is to be understood that by incorporating by reference the foregoing patents to describe examples of specific members of the preferred class of aluminosilicates with greater particularity, it is intended that identification of the therein disclosed crystalline zeolites be resolved on the basis of their respective X-ray diffraction patterns. As discussed above, the present invention contemplates utilization of such catalysts wherein the mole ratio of silica-to-trivalent metal oxide is essentially unbounded in the upper range of values. The incorporation of the identified patents should therefore not be construed as limiting the disclosed crystalline zeolites to those having the specific silica-alumina mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material.

The specific zeolites described, when prepared in the presence of organic cations, are substantially catalytically inactive. They may be activated by heating in an inert atmosphere at 540° C. for one hour, for example, followed by base exchange with ammonium salts followed by calcination at 540° C. in air. The presence of organic cations in the forming solution may not be absolutely essential to the formation of these zeolites, but the presence of these cations does appear to favor their formation. More generally, it is desirable to activate this type catalyst by base exchange with ammonium salts followed by calcination in air at about 540° C. for from about 15 minutes to about 24 hours.

In addition to the hydrogen form, other forms of the zeolite wherein the original alkali metal has been reduced may be used. Thus, the original alkali metal of the zeolite may be replaced by ion exchange with other suitable metal cations of Groups I through VIII of the Periodic Table, including, by way of example, nickel, copper, zinc, palladium, calcium or rare earth metals.

In practicing a particularly desired chemical conversion process, it may be useful to incorporate the crystalline zeolite of this invention with a matrix comprising another material resistant to the temperature and other conditions employed in the process. Such matrix material is useful as a binder and imparts greater resistance to the catalyst for the severe temperature, pressure and reactant feed stream velocity conditions encountered in many cracking processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix, on an anhydrous basis, may vary widely with the zeolite content ranging from about 1 to about 99 percent by weight and more usually in the range of about 5 to about 80 percent by weight of the dry composite.

As has been stated, the zeolites used in this invention may have the original cations associated therewith wholly or partly replaced by a wide variety of other cations according to techniques well known in the art, as by ion exchange. Typical replacing cations include hydrogen, ammonium, and metal cations including mixtures of the same. Of the replacing cations, particular preference is given to cations of hydrogen, alkali, ammonium, rare earth, magnesium, calcium, zinc, copper, silver, platinum, palladium, nickel and mixtures thereof. The metals may be also added by impregnation.

Typical ion exchange techniques include contacting the particular zeolite with a salt of the desired replacing cation or cations. Although a wide variety of salts can be employed, particular preference is given to chlorides, nitrates and sulfates. Pd and Pt can also be exchanged via their tetramine complex ions.

Representative ion exchange techniques are disclosed in a wide variety of patents, including U.S. Pat. Nos. 3,140,249; 3,140,251; and 3,140,253.

Shale oil, as has been stated, contains a relatively high concentration of paraffins and naphthenes. For this reason, it is a particularly suitable chargestock for making diesel fuel, jet fuel and light fuel oil, but a loss desirable chargestock for producing acceptable gasoline. Catalysts having a selectivity to 400°–650° F. distillate are, therefore, desirable for shale oil processing. ZSM-12, for example, shows such selectivity due to its low constraint index and converts the 650° F.+ fraction of shale oil without overcracking the 400°–650° F. product to undesirable lighter fractions. High constraint index zeolitic catalysts (e.g., ZSM-5) produce larger quantities of naphtha and light gases than ZSM-12 and are not as suitable for processing shale oil primarily to distillate.

Other high SiO$_2$/Al$_2$O$_3$ ratio zeolites with similar constraint index's are expected to behave similarly.

Moreover, the least reactive fraction of shale oil which is most difficult to convert to gasoline and diesel-range material, the 850° F.+ portion, is diffusionally restricted from being catalyzed. It has been found that the 850° F.+ portion of hydrotreated shale oil can be converted to 850° F.− material in a hydrogen atmosphere by passing the shale oil over the ZSM-12 described herein. In the high acidity eggshell outer region the large molecules of the 850° F.+ fraction undergo partial cracking and are reduced in average molecular size. The partially converted reactants then can more easily diffuse into the zeolite crystallites. It is believed that the low constraint index (0.4 to 2.5) prevents over-cracking to light gases (i.e. C$_1$–C$_5$). The desirable products of shale oil are primarily diesel fuel, jet fuel and light fuel oil. Diesel fuel normally boils between 380° and 650° F. and has a cetane number greater than 40. The cetane number is related to engine performance; paraffinic fuels, such as shale oil distillate, generally have a high cetane number. Light fuel oil is similar in boiling range to diesel fuel but has no cetane requirements. Jet fuel has a higher volatility than light fuel oil (boiling range 300°–500° F.). The process described in this invention does not necessarily produce the finished fuels but maximizes the material in the boiling range suitable for these fuels.

Having described the invention in general terms, following are Examples that will provide illustrations thereof.

The shale oil used in the example was purchased. It was produced by Occidental Oil's modified in-situ process. Before processing over ZSM-12 this oil was hydrotreated to 340 ppm nitrogen in a fixed-bed reactor containing a commercially available hydrotreating catalyst. Preferred hydrotreating conditions were 2000–2200 psig hydrogen pressure, 750°–775° F., 0.4–0.7 LHSV, and hydrogen circulation of 5000–8000 SCF/B.

The broad range of conditions for the conversion process are:

| | |
|---|---|
| Temperature | 650–825° F. |
| Pressure | 500–3000 psig |
| H$_2$/Oil | 1000–10,000 SCF/B |
| LHSV | 0.2–2.0 |

EXAMPLE 1

ZSM-12 Preparation Without Added NaAlO$_2$

A solution of 80 g of Al(NO$_3$)$_3$.9H$_2$O, 1410 g of 50 percent methyltriethylammonium chloride and 250 g of NaOH (97.6 percent) in 11,000 g H$_2$O was placed in an autoclave. Hi-Sil, 2400 g, was added with 30 rpm stirring. The mixture was gel-whipped for one hour at ambient temperature at a stirring rate of 250 rpm, then aged 24 hours at 50° C. at 30 rpm. Finally, the mixture was heated to 160° C. with 90 rpm stirring rate. After 90 hours at this temperature, the solid was separated from the mother liquor, washed with water and dried at 120° C.

This product gave the x-ray diffraction pattern of ZSM-12. Crystallinity was 105 percent compared to a reference sample. The sorption capacities were, g/100 g of solid:

| | |
|---|---|
| Cyclohexane, 20 Torr | 7.7 |
| n-Hexane, 20 Torr | 6.7 |
| Water, 12 Torr | 6.0 |

The SiO$_2$/Al$_2$O$_3$ molar ratio was 124 and the material contained 1.32 percent Al$_2$O$_3$ based on ignited weight.

EXAMPLE 2

Preparation of ZSM-12 with added NaAlO$_2$

This initial reaction mixture was the same as in Example 1. It was aged for 75 hours at 50° C., then crystallized at 160° C. After 20 hours at 160° C. the crystallinity was 55 percent, compared to a reference sample. At this time, a solution of 40 g of sodium aluminate in 100 g of water was added. Crystallization was complete after 67 hours at 160° C. The solid was separated from the mother liquor, washed with water and dried at 120° C.

The product gave the x-ray diffraction pattern of ZSM-12 and had a crystallinity of 105 percent compared to a reference sample. The sorption capacities were, g/100 g of solids:

| | |
|---|---|
| Cyclohexane, 20 Torr | 7.5 |
| n-Hexane, 20 Torr | 6.8 |
| Water, 12 Torr | 6.7 |

The material contained 2.1 percent Al$_2$O$_3$, based on ignited weight. The SiO$_2$/Al$_2$O$_3$ molar ratio was 77.

EXAMPLE 3

The product of a crystallization similar to Example 1 had a SiO$_2$/Al$_2$O$_3$ molar ratio of 123. A sample of it was calcined in a tube furnace in an ammonia stream to 600° C. and held at this temperature for one hour. The sample was cooled to ambient temperature in ammonia atmosphere. The material was then exchanged three times with 45 ml of a 0.1N NH$_4$Cl/0.1N NH$_4$OH solution at 160° F. in a sealed polypropylene jar for one hour each. Finally, the sample was filtered, washed with chloride-free water at room temperature and dried at the same temperature. The ion-exchanged material contained less than 0.01 weight percent Na. In the n-hexane cracking test it gave an alpha-activity of 81.

EXAMPLE 4

A sample of the product of Example 2 was calcined and ion-exchanged in the same manner as described in Example 3. The ion-exchanged material contained less than 0.01 weight percent Na. The n-hexane cracking activity was alpha=236.

This activity is about twice as high as expected from the overall alumina content, indicating that the shell of the ZSM-12 crystals contains about twice as much alumina as the chemical analysis of the bulk material shows.

Experiments made with Example 4 catalyst demonstrated both the distillate selectivity and the high 850° F.+ conversion capability of the low SiO$_2$/Al$_2$O$_3$ outer shell ZSM-12 zeolite.

EXAMPLE 5

A weight of 1416 g of the product of Example 2 (91.8 percent ash) was mixed with 972 g of Kaiser alumina (72.02 percent solids). Water was added to obtain an extrudable mix. The mixture was extruded with a 1/16" die and the product, containing 65 percent zeolite and 35 percent alumina, on a dry basis, was dried at 120° C.

The extrudate was calcined in flowing nitrogen at 3° C./min. heating rate to 538° C. and held at this temperature for 3 hours. After cooling to ambient temperature, the material was treated with gaseous ammonia.

The extrudate was then ion-exchanged three times with normal ammonium nitrate solution (5 cc/g). The product had a residual sodium content of 0.02 percent. Prior to use as a catalyst, it was calcined for 3 hours at 538° C. in air.

EXAMPLE 6

A weight of 1445 g of the product of crystallization like that of Example 1 (90.2 percent ash) was mixed with 972 g of Kaiser alumina (72.0 percent solids). Extrusion, precalcination and ammonium exchange were carried out in the same manner as described by Example 4. The product had a residual sodium content of 0.01 percent. Prior to use as a catalyst, it was calcined for 3 hours at 538° in air.

EXAMPLE 7

A Nigerian gas oil boiling in the 625°–775° F. boiling range (Table 1) was treated over a ZSM-12 containing catalyst described in Example 5. In a separate experiment, the same gas oil was treated with an NaZSM-5 catalyst. The conditions used in the two experiments and the product yields are shown in Table 2. The higher selectivity of the ZSM-12 catalyst to 400°–650° F. distillate over $C_6$-400° F. naphtha and $C_1$–$C_5$ light products is evident. The total $C_1$–$C_5$ and 400°–650° F. yields by ZSM-12 were 1.19 and 3.1 percent by weight, respectively, whereas the yields by the ZSM-5 catalyst were 10.07 percent by weight for $C_1$–$C_5$ and 15.7 percent by weight for $C_6$-400. Thus, the ZSM-12 catalyst converted the 650° F.+ material to 400°–650° distillate, while the ZSM-5 catalyst overcracked this material to naphtha and light gases.

EXAMPLE 8

A shale oil produced by the Occidental in-situ retort was hydrotreated over a commercially available hydrotreating catalyst to a 340 ppm nitrogen concentration. The feed to the hydrotreater contained 1.4 percent nitrogen and the hydrotreating conditions were 750° F., 2200 psig, 0.4 LHSV, 5000 scf/B $H_2$ circulation. The product from the hydrotreater was processed over a ZSM-12 catalyst prepared as in Example 5, a ZSM-12 catalyst prepared using the procedure in Example 3 and a NaZSM-5 catalyst. The conditions in the experiments and product yields are listed in Table 3. As discussed in Example 6 above, the ZSM-12 catalysts showed a much lower selectivity to $C_1$–$C_5$ light products and $C_6$-400° F. naphtha than the Na/ZSM-5 catalyst. Comparing the product yields of the two ZSM-12 catalysts shows that the ZSM-12 catalyst having a low $SiO_2/Al_2O_3$ shell (Example 4) converted almost all of the 850° F. material while the other ZSM-12 catalyst converted a much lower fraction of the 850° F.+ material. Although the ZSM-5 catalyst also converted the 850° F.+ fraction, much of this conversion was into naphtha and light gases.

EXAMPLE 9

A shale oil is hydrotreated to less than 1000 ppm nitrogen and fractionated to a 650° F.+ and 650° F.− fraction. The 650° F.+ fraction is processed over a ZSM-12 catalyst having a low $SiO_2/Al_2O_2$ shell (Example 5) to convert a portion of the 650°–850° F. material to primarily 400°–650° F. distillate and the 850° F.+ fraction to 650°–850° F. material. The product is fractionated and the 650° F.− fraction is recycled to the ZSM-12 reactor to obtain further conversion into distillate.

TABLE 1

Straight Run Nigerian Gas Oil (625–775° F.) and Properties of Hydrotreated Shale Oil[1] Used in the Experiments

|  | NGO | Shale Oil |
|---|---|---|
| Gravity, °API | 29.1 | 36.1 |
| Pour Point, °F. | 70 | 55 |
| Hydrogen, Wt. Percent | 13.11 | 13.81 |
| Nitrogen, ppm | 300 | 340 |
| Sulfur, Wt. Percent | 0.18 | 0.133 |
| Distillation (D2887) Wt. Percent |  |  |
| I-400° F. | 0 | 13.6 |
| 400–650° F. | 22 | 50.6 |
| 650–850° F. | 78 | 26.9 |
| 850° F.+ | 0 | 8.9 |

[1] Occidental in-situ shale oil

TABLE 2

Comparison of Product Yields From Nigerian Gas Oil Over Na/ZSM-5 and Low $SiO_2/Al_2O_3$ Shell ZSM-12

| Yields Wt. Percent | ZSM-12 with Low $SiO_2/Al_2O_3$ Shell[1] | Na/ZSM-5[2] |
|---|---|---|
| $C_1$–$C_3$ | 0.47 | 1.68 |
| $C_4$ | 0.33 | 3.76 |
| $C_5$ | 0.39 | 4.63 |
| $C_6$-400° F. | 3.1 | 15.7 |
| 400–650° F. | 33.0 | 21.1 |
| 650–850° F. | 59.7 | 53.0 |
| 850° F.+ | 2.0 | 0.0 |
| Pour Point, °F. | 70 | −55 |
| $H_2$ Cons., scf/b | −39 | −11 |

[1] 0.5 LHSV; 2000 psig; 775° F.; 5000 scf/B $H_2$ circulation
[2] 0.5 LHSV; 2000 psig; 725° F.; 5000 scf/B $H_2$ circulation, alpha value = 0.17

TABLE 3

Comparison[1] of the Product Yields From Hydrotreated Shale Oil by Low $SiO_2/Al_2O_3$ Shell ZSM-12, ZSM 12 and Na/ZSM-5

| Yields Wt. Percent | ZSM-12 with Low $SiO_2/Al_2O_3$ Shell | ZSM-12[2] | Na/ZSM-5[3] |
|---|---|---|---|
| $C_1$-$C_3$ | 0.43 | 0.66 | 2.49 |
| $C_4$ | 0.42 | 0.68 | 3.80 |
| $C_5$ | 0.56 | 0.72 | 3.45 |
| $C_6$-400° F. | 14.8 | 15.6 | 22.6 |
| 400–650° F. | 50.8 | 53.8 | 45.1 |
| 650–850° F. | 32.3 | 23.0 | 22.0 |
| 850° F.+ | 0.7 | 5.4 | 0.6 |
| Pour Point, °F. | 65 | 75 | <−65 |
| $H_2$ Cons., scf/B | 47 | 0 | 84 |

[1] All experiments at 0.5 LHSV; 2000 psig; 775° F.; 5000 scf/b $H_2$ circulation
[2] Alpha value = 81 and prepared as in Example 3
[3] Alpha value = 0.17

These experiments have demonstrated both the distillate selectivity and the high 850° F.+ conversion capability of the low $SiO_2/Al_2O_3$ outer shell ZSM-12 zeolite. As shown, a 625°–775° F. Nigerian gas oil and a hydrotreated shale oil were each used in these experiments.

Shale oil has to be hydrotreated prior to processing by the ZSM-12 catalyst expecially since the low constraint index makes the catalyst pores more accessible to basic nitrogen compounds. Although whole range hydrotreated shale oil can be processed over this catalyst, one preferred configuration would process the 650° F.+ material to maximize 400°–650° boiling range product. The examples above illustrate the use of ZSM-12 with low $SiO_2/Al_2O_3$ shell.

We claim:

1. A process for converting a feed selected from the group comprising hydrotreated shale oil, hydrotreated heavy shale oil, and gas oil to a fraction containing from about 50 percent to about 95 percent by weight of oil boiling in the 400°–650° F. boiling range comprising contacting said feed at a temperature of about 650°–825° F., at a pressure of about 500–3000 psig, at a $H_2$/oil ratio of about 1000–10,000 SCF/B and at an LHSV of about 0.1 to 2.0 with a crystalline metallo-silicate zeolite having a constraint index of about 0.4 to about 5 made by steps comprising forming a reaction mixture containing sources of ions selected from an alkali metal or an alkaline earth metal, an organic nitrogen ion, a trivalent metal from one or more of Groups III through VIII of the Periodic Table, silicon and water, said mixture having the appropriate composition in terms of mole ratios of oxides to form said zeolite, reacting until crystallization is from about 20 percent to about 80 percent complete and adding a source of trivalent metal to the partially crystallized reaction mixture, thereby decreasing the silica-to-trivalent metal oxide ratio in the uncrystallized portion of said reaction mixture and forming an outer shell having the same trivalent metal and a lower silica-to-trivalent metal oxide ratio than the inner core, but having the same crystal structure.

2. The process of claim 1 wherein the trivalent metal is aluminum, gallium, boron, chromium or iron.

3. The process of claim 2 wherein the metal is aluminum.

4. The process of claim 3 wherein the zeolite has the crystal structure of ZSM-12.

5. The process of claim 3 wherein the zeolite has the crystal structure of ZSM-35.

6. The process of claim 3 wherein the zeolite has the crystal structure of ZSM-38.

7. The process of claim 3 wherein the zeolite has the crystal structure of zeolite Omega.

8. The process of claim 3 wherein the zeolite has the crystal structure of (TMA) offretite.

9. The process of claim 3 wherein the zeolite has the crystal structure of mordenite.

10. The process of claim 1 wherein the feed is a gas oil.

11. The process of claim 10 wherein the feed is a gas oil boiling in the 625°–775° F. range.

12. The process of claim 1 wherein the constraint index of said zeolite is about 0.4 to 2.5.

13. A process for converting a feed selected from the group of hydrotreated shale oil and gas oil to lighter components comprising contacting said feed, in the presence of hydrogen, at a temperature ranging from about 650° to about 825° F., at a pressure of about 500 to about 3000 psig, at a $H_2$/oil ratio of 1000–10,000 SCF/B and a LHSV of about 0.2 to about 2.0, with ZSM-12 zeolite made by forming a reaction mixture containing sources of ions selected from an alkali metal or an alkaline earth metal, an organic nitrogen ion, a trivalent metal from one or more of Groups III through VIII of the Periodic Table, silicon and water, said mixture having the appropriate composition in terms of mole ratios of oxides to form said zeolite, reacting until crystallization is from about 20 percent to about 80 percent complete and adding a source of trivalent metal to the partially crystallized reaction mixture, thereby decreasing the silica-to-trivalent metal oxide ratio in the uncrystallized portion of said reaction mixture and forming an outer shell having the same trivalent metal and a lower silica-to-trivalent metal oxide ratio than the inner core, but having the same crystal structure.

14. The process of claim 1 wherein the feed is a hydrotreated heavy shale oil fraction.

* * * * *

UNITED STATES PATENT AND TRADEMARK OFFICE
CERTIFICATE OF CORRECTION

PATENT NO. : 4,521,297

DATED : June 4, 1985

INVENTOR(S) : Philip J. Angevine and Guenter H. Kuehl

It is certified that error appears in the above-identified patent and that said Letters Patent is hereby corrected as shown below:

Column 1, lines 55 and 56, after the word temperatures insert --of--.

Column 6, line 58, change "loss" to --less--.

Signed and Sealed this

Fourth Day of November, 1986

[SEAL]

Attest:

DONALD J. QUIGG

Attesting Officer

Commissioner of Patents and Trademarks